United States Patent [19]
Check, III

[11] Patent Number: 5,463,492
[45] Date of Patent: Oct. 31, 1995

[54] LIGHT MODULATING FILM OF IMPROVED CLARITY FOR A LIGHT VALVE

[75] Inventor: Joseph A. Check, III, West Bayshore, N.Y.

[73] Assignee: Research Frontiers Incorporated, Woodbury, N.Y.

[21] Appl. No.: 972,830

[22] Filed: Nov. 6, 1992

Related U.S. Application Data

[63] Continuation-in-part of Ser. No. 786,511, Nov. 1, 1991, abandoned.

[51] Int. Cl.$^6$ .................................................. G02B 26/00
[52] U.S. Cl. .................................................. 359/296; 252/583
[58] Field of Search ..................... 359/296, 52; 252/582, 252/583, 585

[56] References Cited

U.S. PATENT DOCUMENTS

| | | | |
|---|---|---|---|
| 3,257,903 | 6/1966 | Marks | 359/296 |
| 3,341,274 | 9/1967 | Marks | 359/296 |
| 4,025,163 | 5/1977 | Saxe et al. | 359/296 |
| 4,078,856 | 3/1978 | Thompson et al. | 359/296 |
| 4,164,365 | 8/1979 | Saxe | 359/296 |
| 4,247,175 | 1/1981 | Saxe | 359/296 |
| 4,407,565 | 10/1983 | Saxe | 359/296 |
| 4,422,963 | 12/1983 | Thompson et al. | 359/296 |
| 4,435,047 | 3/1984 | Fergason | 359/52 |
| 4,579,423 | 4/1986 | Fergason | 359/52 |
| 4,616,903 | 10/1986 | Fergason | 359/52 |
| 4,657,349 | 4/1987 | Labes et al. | 359/296 |
| 4,685,771 | 8/1987 | West et al. | 359/46 |
| 4,919,521 | 4/1990 | Tada et al. | 359/296 |
| 5,211,877 | 5/1993 | Andrejewski et al. | 252/299.01 |
| 5,223,959 | 6/1993 | Wu et al. | 359/52 |

FOREIGN PATENT DOCUMENTS

| | | |
|---|---|---|
| 350354 | 1/1990 | European Pat. Off. . |
| 551138 | 1/1993 | European Pat. Off. . |
| 63-82191 | 5/1988 | Japan . |
| 63-30325 | 12/1988 | Japan . |
| 64-38732 | 2/1989 | Japan . |
| 64-57242 | 3/1989 | Japan . |
| 1126629 | 5/1989 | Japan . |
| 2232630 | 9/1990 | Japan . |
| 1306981 | 6/1973 | United Kingdom . |
| 1468768 | 8/1977 | United Kingdom . |

OTHER PUBLICATIONS

P. S. Drazaic, J. Appl. Phys. 60(6), 2142–2148 (1986).
T. Kajiyama et al, Progress In Pacific Polymer Science, pp. 343–345, 348, Springer–Verlag, Berlin (1991).

*Primary Examiner*—Georgia Y. Epps
*Assistant Examiner*—Thomas Robbins
*Attorney, Agent, or Firm*—Rosenman & Colin

[57] ABSTRACT

A film suitable for use as the light modulating unit of a light valve comprises a cross-linked polymer matrix having droplets of a liquid light valve suspension distributed in the cross-linked polymer matrix, and a light valve comprising such a film.

28 Claims, 1 Drawing Sheet

LIGHT MODULATING FILM OF IMPROVED CLARITY FOR A LIGHT VALVE

CROSS-REFERENCE

The present application is a continuation-in-part of my U.S. application Ser. No. 786,511, filed Nov. 1, 1991, now abandoned, which is incorporated herein by reference thereto.

FIELD OF THE INVENTION

The present invention relates to light valves and more particularly to improvements relating to incorporating within a plastic film a light valve suspension used to control light transmission in a light valve.

BACKGROUND

Light valves have been used for over fifty years for modulation of light. A light valve may be described as a cell formed of two walls that are spaced apart by a small distance, at least one wall being transparent, the walls having electrodes thereon usually in the form of transparent conductive coatings. The cell contains a "light valve suspension" of small particles suspended in a liquid suspending medium. In the absence of an applied electrical field, the particles in the liquid suspension exhibit random Brownian movement, and hence a beam of light passing into the cell is reflected, transmitted or absorbed, depending upon the nature and concentration of the particles and the energy content of the light. When an electric field is applied through the light valve suspension in the light valve, the particles become aligned and for many suspensions most of the light can pass through the cell. Light valves have been proposed for many purposes including, e.g., alpha-numeric displays, television displays, windows, mirrors, eyeglasses and the like to control the amount of light passing therethrough.

My United States patent application filed concurrently herewith, entitled Light Valve Employing A Film Comprising an Encapsulated Liquid Suspension, And Method Of Making Such Film, Ser. No. 972,826, filed Nov. 6, 1992, is incorporated herein by reference thereto. That application describes a film suitable for use in a light valve, comprising a cross-linked polymer matrix having droplets of a light valve suspension distributed in the cross-linked polymer matrix, the light valve suspension comprising particles suspended in a liquid suspending medium. The particles exhibit random Brownian movement in the absence of an electric field applied to the light valve suspension and become aligned in the presence of an electric field applied to the light valve suspension.

SUMMARY OF THE INVENTION

In one embodiment of the present invention, a film suitable for use as the light modulating unit of a light valve is provided, which comprises a cross-linked polymer matrix that contains functional groups soluble in the liquid light valve suspension. In particular, the polymer matrix is provided by a liquid cross-linkable copolymer emulsifier that includes such functional groups. The film may be formed by providing an emulsion of the liquid light valve suspension in the liquid cross-linkable copolymer emulsifier, followed by a cross-linking reaction. The liquid cross-linkable copolymer emulsifier not only provides the cross-linked polymer matrix, but also acts as an emulsifier in forming the film.

The film may comprise a cross-linked polyorganosiloxane polymer matrix and the liquid light valve suspension distributed in the cross-linked polymer matrix may include a partially or fully fluorinated polymeric stabilizer, whereby the light scatter or "haze" of the light valve film is substantially reduced. Further improvements in the reduction of the haze may be obtained by providing the cross-linked polyorganosiloxane polymer matrix with aromatic groups and/or by swelling the film with a partially or fully fluorinated organic liquid. As used herein, the term "fluorinated" means a partially or fully fluorinated material.

In another embodiment of the present invention, a liquid light valve suspension of particles in a liquid suspending medium is provided comprising in whole or in part a liquid polymeric stabilizer, which enables the light valve suspension to be loaded with a larger concentration of particles. The resulting liquid light valve suspension, whether used as such in a light valve or incorporated into a film, is stable and yet darker than previously obtainable, which in turn provides increased contrast between the ON and OFF states.

The present invention also provides a light valve, comprising a cell having spaced apart cell walls and a film and/or liquid light valve suspension of the invention between the cell walls.

The Liquid Light Valve Suspension

The liquid light valve suspension distributed in the cross-linked polymer matrix of the film of the present invention may be any liquid light valve suspension known in the art and may be formulated according to known techniques. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light absorbing or light reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobaltchloride sulfate polyiodide, as, e.g., in U.S. Pat. No. 1,956,867. Preferably, the particles are light-polarizing polyhalide particles such as those described in U.S. Pat. Nos. 4,877,313 and 5,002,701 which are more environmentally stable than prior art polyhalides.

In theory, any type of particle capable of reflecting, absorbing and/or transmitting desired wavelengths of visible light can be used in the liquid light valve suspension. For the purposes of the present invention, however, particles that reflect a substantial amount of visible light can cause objectionable light scatter and are therefore not usually desirable.

The shape of the particles used in the light valve suspension should preferably be "anisometric", i.e. the shape or structure of the particle is such that in one orientation the particle intercepts more light than in another orientation. Particles which are needle-shaped, rod-shaped, lath-shaped, or in the form of thin flakes, are suitable. Light-polarizing crystals are especially useful because they produce a pleasing visual appearance, but any type of light-absorbing particle, preferably exhibiting very little light scatter, can be employed.

The particles are preferably of colloidal size, that is the particles will have a large dimension averaging about 1 micron or less. It is preferred that most particles have large dimensions less than one-half of the wavelength of blue light, i.e. 2000 Angstroms or less to keep light scatter extremely low.

The particles are also preferably light-absorbing, that is the particles absorb a significant part, preferably most, of the light impinging on it and scatter relatively little of the light that impinges on them. Light-absorbing particles comprise many types of material including colored orientable pigments and dyes, e.g. garnet red, conductive black or grey material such as graphite or carbon black, dichroic dyes such as are widely used in guest-host liquid crystal devices, light-polarizing materials, e.g., cupric bromide, and polyhalides, and especially polyiodides, e.g., those described in conjunction with prior art light valve devices.

The term "polyiodide" as used herein is used in the conventional sense and also in the same sense as the term "periodide" is used in numerous prior art light valve patents, e.g., see column 1 of U.S. Pat. No. 1,951,664 (Land) entitled "Colloidal Suspensions and the Process of Making Same", to indicate a material which is a reaction product of a precursor compound, which may be a sulfate (or certain other salts as described in U.S. Pat. No. 4,270,841) of heterocyclic nitrogenous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20, pp. 1005–1016, (1950). Herapathite, for example, is quinine bisulfate polyiodide, and its formula is given under the heading "quinine iodosulfate" as $4C_{20}H_{24}N_2O_2 \cdot 3H_2SO_4 \cdot 2HI \cdot I_4 \cdot 6H_2O$ in The Merck Index, 10th Ed. (Merck & Co., Inc., Rahway, N.J.). In more modern, preferred types of polyiodides, the precursor compound need not be a salt, e.g., see U.S. Pat. Nos. 4,877,313 and 5,002,701. In these polyiodide compounds the iodine is thought to form chains and the compounds are strong light polarizers. The term "polyhalide" is used herein to mean a compound such as a polyiodide, but wherein at least some of the iodine in the iodide is replaced by another halogen element.

The liquid light valve suspension distributed in the film of the present invention may include any of the liquid suspending media previously proposed for use in light valves for suspending the particles. In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pat. No. 4,247,175. In general one or both of the liquid suspending medium or the polymeric stabilizer dissolved therein is chosen so as to maintain the suspended particles in gravitational equilibrium.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, trialkyl trimellitate, etc. to provide gravitational equilibrium to the suspended particles and to assist in dispersing the particles in the liquid suspending medium. Other materials useful as the miscible electrically resistive organic liquid are those disclosed in U.S. Pat. No. 4,772,103, and details concerning the liquid suspending material may be found in U.S. Pat. No. 4,407,565.

Other types of suspensions which do not incorporate such halogenated liquids can also be used and can maintain the particles in gravitational equilibrium if a sufficient quantity of stabilizing polymer is employed therein.

Another useful light valve suspension is based on the use as the liquid suspending medium of non-volatile or minimally volatile organic liquids, commonly classified as plasticizers. Such "plasticizer" liquid suspending media may comprise one or more electrically resistive, chemically inert, relatively non-volatile (high boiling) organic liquids that will suspend the particles and will dissolve the polymeric stabilizer but not the matrix polymer. For example, where the polymeric stabilizer includes a solid poly(meth)acrylate, useful liquid suspending media include liquid plasticizers for poly(meth)acrylates, such as adipates, benzoates, glycerol triacetate, isophthalates, mellitates, oleates, chloroparaffins, phthalates, sebacates and the like. Liquid suspending media for other solid polymeric stabilizers may be similarly selected form liquids useful as plasticizers for such polymers. Preferably, trialkyltrimellitates, such as tri-n-propyl- or tri-n-butyl-trimellitate and/or dialkyl adipates, such as di-2-ethylhexyl adipate, may be used as the liquid suspending medium for solid polymeric stabilizers based on copolymers of neopentyl(meth)acrylate.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles.

Preferably, to keep the particles in suspension, the liquid suspending medium may also comprise as the solid polymeric stabilizer an A-B type block polymer as disclosed in U.S. Pat. No. 855,266, filed Mar. 23, 1992 now U.S. Pat. No. 5,279,773, issued Jan. 18, 1994, which is incorporated herein by reference thereto, and in European Patent Publication 350,354. Nitrocellulose and/or other solid polymeric stabilizers may also be usefully provided in the liquid suspending medium in addition to the block polymer. It is preferred to use just enough A-B block polymer to maintain the particles in suspension, the amount to be used for a given light valve suspension being empirically determined, as is known. Usually, the amount of the solid polymeric stabilizer will be from about 1% to about 30% such as from 5% to about 25%, by weight, based on the total weight of the liquid light valve suspension. However, while the use of a solid polymeric stabilizer is preferred, it need not be used in all cases. Indeed, liquid polymeric stabilizers may be used to advantage, as described in detail hereinafter.

Liquid Polymeric Stabilizers

The polymeric stabilizers previously proposed for use in a liquid light valve suspension have generally been glassy solids. A concentrate of a liquid light valve suspension made using a glassy solid polymer as the polymeric stabilizer must also use a liquid suspending medium that includes a solvent, as described above, to enable the concentrate to be processed into a usable film, but the solvent imposes limitations on the amount of particles that can be included in the concentrate. However, where the polymeric stabilizer is a liquid polymer, the liquid polymeric stabilizer can provide part, or preferably all, of the liquid suspending medium and thus the concentrate can contain a much larger percentage of particles, which in turn enables the production of a thinner, darker film than otherwise.

Also where the matrix polymer and the polymeric stabilizer have both been modified by the substitution of phenyl and fluorine, respectively, it would be very difficult to find a solvent that would dissolve one without dissolving the other. An additional problem encountered with the use of a solvent for a solid polymeric stabilizer is that the refractive index of the solvent can be very much higher than that of the matrix polymer and solid polymeric stabilizer, which increases the amount of haze in the film. These problems are avoided by the use of a liquid polymeric stabilizer.

The liquid polymeric stabilizer is prepared in a conventional manner by using a monomer or monomers that will provide the polymeric stabilizer with a sufficiently low glass transition temperature so that the polymeric stabilizer is liquid at room temperature (about 20° C.) For example, the proper selection of pendant alkyl groups, with respect to the number of carbon atoms as well as the presence or absence of branching as is shown in the art, enables the production of a polymer with a predetermined glass transition temperature (which may be as low as −70° C.). The molecular weight of the polymer will determine the viscosity of the polymeric stabilizer, the higher the molecular weight, the higher the viscosity, as is known. A suitable range of molecular weight for the liquid polymeric stabilizer is from about Mw 1000 to about Mw 2 million.

The monomers for the liquid polymeric stabilizer will be selected as described above for the solid polymeric stabilizer so that the resulting liquid polymeric stabilizer will not dissolve the matrix polymer, but will bond to the surface of the particles and be miscible with any other liquids comprising the liquid suspending medium. Where the particles are coated with nitrocellulose, the liquid polymeric stabilizer preferably includes a small percentage of functional groups that enable the polymeric stabilizer to associate with nitrocellulose, such as groups derived from an unsaturated organic acid, ester or anhydride thereof, such as maleic acid anhydride, or other suitable functional groups such as methylol acrylamide, 2-hydroxyethyl(meth)acrylate, etc. Useful liquid polymeric stabilizers include polymerized units of alkyl(meth)acrylates, such as n-butyl acrylate, and/or fluorinated alkyl(meth)acrylates, such as heptafluorobutylacrylate and the like, usually with a small percentage of an unsaturated acid, ester or anhydride thereof, methylol acrylamide, 2-hydroxyethyl(meth)acrylate or the like. In the Examples that follow, the proportions of the monomers are given in weight percentages of the monomers charged. In some cases, the percentages differ slightly from 100%.

Since the molecular weight of a liquid polymeric stabilizer can be controlled, its viscosity can be adjusted to produce a light valve suspension which consists only of a lower viscosity liquid polymeric stabilizer and particles. Separate liquid suspending medium and polymeric stabilizer are not needed. This light valve suspension can then be encapsulated in an matrix polymer whose index of refraction is matched to that of the liquid polymeric stabilizer to form a low haze film that does not need to be swelled. This is ideal for those cases where it is desirable to produce the film between conductive coated substrates of rigid or flexible glass or plastic without further processing (a sandwich cell). This would be particularly useful in those cases where a fast decay time is not required, for instance in architectural glazing.

Manufacture of The Film Using The Cross-Linkable Copolymer Emulsifier

According to the present invention, a film useful as the light-modulating agent of a light valve may be prepared by forming an emulsion of the liquid light valve suspension in a liquid cross-linkable copolymer emulsifier. The cross-linkable copolymer emulsifier serves the dual function of providing the cross-linked matrix polymer and an emulsifier. The cross-linkable copolymer has a main chain that includes and is preferably terminated by cross-linkable groups at each end, the main chain being insoluble in the liquid light valve suspension. The cross-linkable copolymer emulsifier also has pendant polymeric groups depending from the main chain, the polymeric groups being soluble in the liquid light valve suspension. Any cross-linking agent that is required to form the polymer matrix is included in the emulsion.

The film of the invention may be prepared by mixing together the liquid cross-linkable copolymer emulsifier, cross-linking agent, catalyst, if any, and liquid light valve suspension, to form an emulsion of a multitude of droplets of liquid light valve suspension in the liquid cross-linkable copolymer emulsifier. The emulsion can then be cast as a film and allowed to cure, thus yielding a film containing encapsulated droplets of the liquid light valve suspension.

The liquid cross-linkable copolymer emulsifier and the liquid light valve suspension are chosen so that the components of one will not deleteriously affect the other. Moreover, the cross-linking agent used to form the cross-linked polymer matrix, the by-products of the cross-linking reaction, if any, and the cross-linking conditions, e.g. temperature, pressure etc. must also be compatible with and not adversely affect the cross-linkable copolymer emulsifier, the cross-linked polymer matrix and/or the light valve suspension. For example, if the particles are heat-sensitive, the cross-linking reaction must take place at a temperature at which the particles are stable. If the particles are adversely affected by water, the by-products of the cross-linking reaction must be non-aqueous.

The main chain of the liquid cross-linkable copolymer emulsifier may be a polyorganosiloxane, polybutadiene, polystyrene, poly(cyclopropene), polyamide, polyolefin, silicone gum, polyacrylamide, polyurethane, and the like. The liquid cross-linkable copolymer emulsifier may inherently have functional groups that enable it to be cross-linked, such as a polyacrylamide, or it may comprise a polymeric chain that has been modified to include such functional groups, such as a dihydroxy terminated polydimethylsiloxane. Cross-linkable functional groups are known in the art and include hydroxy, carboxy, amine, amide, silane, and the like. The cross-linkable copolymer emulsifier may have two or more cross-linkable functional groups per molecule, and may even comprise a large number of such groups provided that the solubility requirements previously stated herein are met. Such cross-linkable functional groups may be located not only at or near the ends of the main chain but also along the main chain and may be substituted either directly to the main chain or on groups pendant from the main chain.

Appropriate cross-linking agents are those that will react with the cross-linkable functional groups, as is known, such as alkoxy silanes, alkyl orthotitanates and the like. One or both of the cross-linkable copolymer emulsifier and the cross-linking agent must have a cross-linking functionality greater than two, as is known. The cross-linking reaction may also be a condensation between polyfunctional monomers that gives rise to a cross-linked polymer.

The liquid cross-linkable copolymer emulsifier may be prepared by conventional copolymerization techniques. For example, a prepolymer with functional groups, Y, such as $$Y\text{---}[A]_m\text{---}Y \qquad (I)$$

may be linked with a second prepolymer (II) having functional groups, X, such as

$$X\text{---}L\text{---}X \qquad (II)$$
$$\quad |$$
$$[B]_n$$

to form a liquid cross-linkable copolymer emulsifier (III) having a main chain terminated by cross-linkable groups and having pendant polymeric groups, such as

In the above illustration, m, n, and o are integers, A and B are residues of polymers that are, respectively, insoluble and soluble in the liquid light valve suspension, and L is a linking group.

Alternatively, the prepolymer, Y—[A]$_m$Y, may be reacted with a cross-linking agent (IV), $$L\text{---}CH\text{=}CH_2 \qquad (IV),$$

to form prepolymer (V) having pendant groups terminated with a vinyl groups, such as

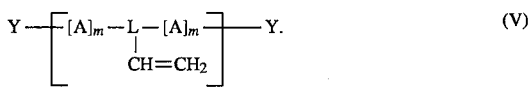

Prepolymer (V) can then be copolymerized with a vinyl monomer to provide the pendant polymeric emulsifier groups of the copolymer emulsifier (III).

Where the cross-linking agent is trifunctional, it is possible for the main chain to have pendant polymeric emulsifier groups and pendant functional groups, X. In such cases, the trifunctional cross-linking agent can link together two polymeric main chains, such as

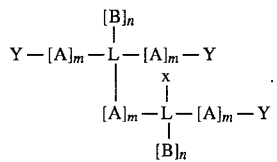

It is presently preferred to use a polyorganosiloxane as the main chain of the cross-linkable copolymer emulsifier. Polyorganosiloxanes comprise repetitive units of silicon atoms linked to oxygen atoms, where the silicon atoms are substituted by one or usually two substituted or unsubstituted organic groups, and, of course, they also comprise cross-linkable functional groups. Useful organic groups include aliphatic, cycloaliphatic, aromatic, heterocyclic, aliphatic aromatic, aromatic aliphatic and the like. The organic group is preferably saturated aliphatic or aromatic. Most preferably, the organic group is alkyl, aryl, aralkyl or alkaryl.

The polyorganosiloxane main chain may be a homopolymer, such as homopolymer of the unit

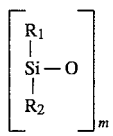

where $R_1$ and $R_2$ are the same or different organic groups, or a copolymer, such as a copolymer of the units

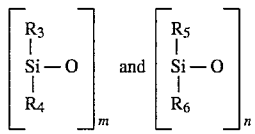

wherein at least one of $R_3$–$R_6$ is a different organic group than the others, and m and n are integers. For example $R_3$, $R_4$ and $R_5$ may be alkyl, preferably methyl, whereas $R_6$ may be aryl or aralkyl, preferably phenyl.

The polyorganosiloxane main chain may also be a silarylene-siloxane copolymer, such as a copolymer of the units:

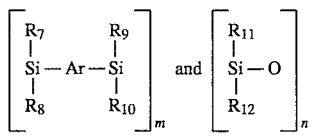

where $R_7$–$R_{12}$ are the same or different organic groups and Ar is arylene. For example, $R_7$–$R_{12}$ may be alkyl, such as methyl, and Ar may be phenylene, naphthylene and the like, preferably phenylene.

A cross-linked polymer matrix derived from a polyorganosiloxane is preferred for use in the present invention for many reasons. The cross-linked polyorganosiloxanes have excellent oxidation and UV stability and are stable over a wide temperature range. Indeed, when the polyorganosiloxane includes some aromatic groups, such as when some of the silicon atoms in the main chain are substituted by aryl (e.g. $R_6$ is phenyl) or are linked together by arylene (e.g. when Ar is phenylene), the temperature stability is increased. Because of the wide availability of polyorganosiloxanes and the ease with which they may be cross-linked and the absence of harmful by-products from the cross-linking reaction, these polymers are relatively inexpensive to make and use.

Moreover, a cross-linked polyorganosiloxane polymer matrix is compatible with a broad range of particles, liquids and polymeric stabilizers used in light valve suspensions. Equally important, the cross-linked polyorganosiloxane polymer matrix provides the film with a high dielectric strength, which allows for the use of large voltages across the light valve cell without arcing.

When the main chain of the cross-linkable copolymer emulsifier is a polyorganosiloxane, it is preferred that the pendant groups are provided by polyacrylates, polymethacrylates, polyethers, polymethylstyrenes, alkyd resins, polyamides, polyurethanes, polycarbonates, epoxy resins and the like. In a presently preferred embodiment of the invention, the pendant groups are acrylates or methacrylates.

A suitable process for preparing liquid cross-linkable copolymer emulsifiers having a polyorganosiloxane main chain and pendant (meth)acrylate groups is to copolymerize a polyorganosiloxane having terminal hydroxy groups with a (meth)acryloxypropyl-dialkoxyalkylsilane, -trialkoxysilane, -diaryloxyalkylsilane, or -triaryloxysilane, and a (meth)acrylate monomer. For example, when a (meth)acryloxypropyl-dimethoxymethylsilane or -trimethoxysilane is used, the resulting cross-linkable emulsifier will have repeating units, such as

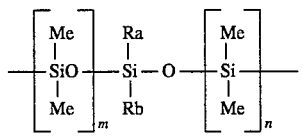

where Ra is methyl or methoxy (depending on whether a -dimethoxymethylsilane or -trimethoxysilane was used) and $R_b$ is a poly(meth)acrylate linked to the silicon atom via a propylene group. If Ra is methoxy, then another polyorganosiloxane main chain may be linked to the depicted silicon atom by reaction of the methoxy group with a terminal hydroxy group of the dihydroxy-terminated polyorganosiloxane. Suitable catalysts are preferably employed.

Alternatively, a (meth)acrylate prepolymer can be prepared by copolymerizing a (meth)acrylate with the (meth)acryloxypropyl-dialkoxyalkylsilane, -trialkoxysilane, -diaryloxyalkylsilane, -triaryloxysilane etc. and then condensing the (meth)acrylate prepolymer with a dihydroxy-terminated polyorganosiloxane.

Suitably, the polyorganosiloxane moiety of the liquid cross-linkable copolymer emulsifier may have a molecular weight of from about Mw 17,000 to about Mw 3 million, preferably from about Mw 30,000 to about Mw 450,000. Moreover, it is at present contemplated that the polyorganosiloxane main chain will constitute more than about 50%, preferably more than about 90% by weight of the cross-linkable copolymer emulsifier.

While it is presently preferred to use pendant poly(meth)acrylate groups, polymers of other unsaturated acids or esters, such as fumarates, maleates and the like can also be used.

It is presently preferred to cross-link the polyorganosiloxane copolymer emulsifier with a multifunctional alkoxy silane cross-linking agent, primarily for reasons of convenience and economics.

The cross-linking reaction may be catalyzed by metal salts of organic acids (e.g. tin octoate, ferric octoate, dibutyl tin dilaurate, etc.) at room temperature. The amount and type of catalyst and/or cross-linking agent can be varied to change both the rate of cross-linking of the polymer matrix and the properties of the resulting cross-linked polymer matrix.

The use of the liquid cross-linkable copolymer emulsifier has several advantages. Thus, the cross-linkable copolymer emulsifier does not require the use of a separate emulsifier. The cross-linkable copolymer emulsifier also ensures that each droplet of light valve suspension will be surrounded by the polyorganosiloxane polymer matrix, thus avoiding bleeding of light valve suspension from imperfectly enclosed droplets. The cross-linkable copolymer emulsifier also prevents coalescence of the droplets, which enables the production of smaller capsules and a smaller size distribution of the capsules. In addition, a higher ratio of liquid light valve suspension to polyorganosiloxane matrix polymer can be obtained without phase reversal (i.e. capsules of polyorganosiloxane in a suspension matrix), which enables the production of darker, thinner and more homogeneous films.

Reduction Of Haze In The Film

Light valves of the prior art described in many of the above mentioned patents, e.g., U.S. Pat. No. 4,407,565, which use light-absorbing particles, exhibit excellent optical clarity and scatter very little light even though the index of refraction $n_D$ of the liquid suspending medium of their liquid light valve suspensions is far less than the index of refraction of the electrode material. For example, the index of refraction of one commonly used electrode material, indium tin oxide, is about 2.0 (although it can be somewhat higher or lower depending on layer thickness), whereas the index of refraction, $n_D$, for the liquid suspending medium will fall in the range of 1.33–1.68 and is usually in the range of about 1.38–1.56. Likewise $n_D$ for the liquid suspending medium can be substantially lower or higher than that of the glass sheets usually used as the walls of the light valve. The refractive index of glass varies according to the composition of the glass but is commonly about 1.52.

Although some light is lost in a light valve by absorption in or by reflection from the electrodes and walls, no objectionable light scatter is normally caused by them despite the fact that their refractive indices usually differ substantially from that of the liquid suspending medium. Hence, the refractive indices of the walls and electrodes of the light valve can be ignored.

It has now been found by the present invention that the haziness or light scatter of a film comprising a cross-linked matrix polymer having a liquid light valve suspension incorporated therein can be reduced by modifying the matrix polymer and/or the liquid portion of the liquid light valve suspension which contains or is a polymeric stabilizer so that their indices of refraction are more closely matched.

In the preferred system employing a polyorganosiloxane as the cross-linked matrix polymer, this can be accomplished by using a liquid fluorinated polymeric stabilizer in the liquid light valve suspension to lower the index of refraction of the polymeric stabilizer. Further improvement is possible if the polyorganosiloxane contains aromatic groups to raise the index of refraction of the matrix polymer.

In particular, where the polyorganosiloxane matrix polymer is a polyalkylsiloxane, such as a polydimethylsiloxane, a reduction in the haze of the film can be obtained by using as the polymeric stabilizer a poly(meth)acrylate containing fluorine atoms. Further reduction in the haze can be obtained by introducing aromatic groups into the polyalkylsiloxane. This can be accomplished by providing a copolymer of an alkylsiloxane and an arylsiloxane or through the use of a silarylene-siloxane copolymer, as described above.

If the amount of aromatic groups introduced into the polyorganosiloxane matrix polymer is too large, the polymeric stabilizer in the liquid light valve suspension may become soluble in the liquid polyorganosiloxane matrix polymer, which will prevent the particles from orienting in the presence of an electrical field. If the fluorine content in the polymeric stabilizer is too large, it will become incompatible with any nitrocellulose used in the liquid light valve suspension. It has now been found that the optimum solution is to introduce a controlled amount of aromatic groups into the organosiloxane moiety of the cross-linkable copolymer emulsifier and to introduce fluorine atoms into the emulsifier moiety thereof, while also providing fluorine substitution in the liquid polymeric stabilizer.

The use of a silarylene-siloxane copolymer to provide a polyorganosiloxane main chain in which an arylene, e.g. phenylene, group links together two silicon atoms in the main chain of the polymer has several benefits, the most important of which is that the tendency of the polymer to depolymerize, via a ring-chain equilibrium reaction, is reduced. However, from the standpoint of determining the refractive index of the matrix polymer, the same improvement in reducing haze can be obtained with the same mole percent of phenyl or phenylene groups if the molecular weights are essentially the same, even though in one matrix polymer the phenyl groups are linked to a silicon atom whereas in another matrix polymer the phenylene groups are linked to two silicon atoms.

This concept of haze reduction is also applicable to films made in accordance with a liquid cross-linkable polyorganosiloxane that does not have emulsifier groups is used to form the matrix polymer. In such cases, the cross-linkable polyorganosiloxane may be modified to include aromatic groups while the liquid polymeric stabilizer is modified to include fluorine. Preferably, this system also includes a copolymer of an organosiloxane and a copolymerizable organic monomer as a (non-cross-linkable) copolymer emulsifier. When such a non-cross-linkable copolymer emulsifier is employed, a limited amount of aromatic groups will be introduced into the organosiloxane moiety of the copolymer emulsifier and into the cross-linkable polyorganosiloxane oligomer or polymer, while fluorine substitution will be provided in the organic polymer moiety of the copolymer emulsifier and into the liquid polymeric stabilizer.

The levels of substitution will necessarily be empirically determined to reduce the haziness of the film without encountering adverse effects. Moreover, a relatively larger amount of aromatic groups in the organosiloxane moiety of the matrix polymer and copolymer emulsifier can be offset by the use of a relatively small amount of fluorinated monomer in the polymeric stabilizer, and vice versa.

Swelling of the Film

If a film prepared from the cross-linked polymer matrix is allowed to absorb a suitable organic liquid, the film swells and light scatter is also reduced. Moreover, the droplets of suspension encapsulated within the cross-linked polymer matrix appear to absorb the liquid and swell. This "dilution" of the suspension produces a marked decrease in the decay time (by a factor of up to 600) of the film when exposed to an applied electric field. Also, the electrical response of the swollen, cross-linked film with respect to frequency and voltage is greatly improved. Swollen films can be driven at a frequency as low as 25 Hertz or less.

Liquids that can be used to swell the film include but are not limited to aliphatic hydrocarbons, halocarbons, esters, ethers, alcohols, aromatic hydrocarbons, aromatic esters, etc. Suitable liquids include: isopentyl acetate, hexyl acetate, octyl acetate, decyl acetate, butyl butyrate, isopropyl butyrate, neopentyl neopentanoate and many other simple aliphatic esters. Other useful liquids include hexane, heptane, 3-methyl decane, 3,6-dimethyl octane and other straight or branched chain hydrocarbons. Further useful liquids include aromatic hydrocarbons, such as benzene, toluene, xylene and the like, cycloaliphatic hydrocarbons and halogenated or perhalogenated hydrocarbons, such as perfluorohydrocarbons and/or perfluoro/perchloro hydrocarbons, such as $CCl_3CF_2CFCl_2$, $CCl_3CF_2CFClCF_2Cl$, a liquid, low molecular weight fluorocarbon polymer having a specific gravity of at least 1.5 and having at least about 50% of its atoms constituted by halogen atoms, at least 60% of the halogen atoms being fluorine and the balance chlorine and/or bromine, or the like.

Suitable liquids will have the following characteristics:
(1) the liquid is absorbed by the cross-linked polymer matrix; and
(2) the liquid is a solvent for the nitrocellulose and/or other polymeric stabilizer that may be used.

In the preferred system using a polyorganosiloxane matrix polymer, it is presently preferred to swell the film with a halogenated hydrocarbon.

Other Additives

The liquid light valve suspension and/or the film or light valve of the present invention may optionally also have therein other compatible materials, such as ultraviolet radiation absorbers, heat stabilizers and non-polymeric surfactants and dispersants, etc.

There are several ways in which a U.V. stabilizer may be incorporated into the film. For instance, the U.V. stabilizer may be dissolved in the swelling agent and so be introduced into the film. Or the U.V. stabilizer may be added to the concentrate before mixing with the matrix polymer. Or the U.V. stabilizer may be mixed with the polymer matrix. Or the U.V. stabilizer may be incorporated directly into the polymer matrix (by substituting, for example, U.V. absorber molecules for some of the methyl groups in the polydimethylsiloxane polymer or other such substitution in other matrix polymers). Or the U.V. absorber may be directly incorporated into the suspending polymer via derivatisation of a U.V. stabilizer to a reactive monomer, and subsequent co-polymerization to yield the suspending polymer.

DESCRIPTION OF THE DRAWING

The present invention is illustrated in terms of a preferred embodiment by reference to the accompanying drawing in which.

DETAILED DESCRIPTION OF THE DRAWINGS

Figure 1A:
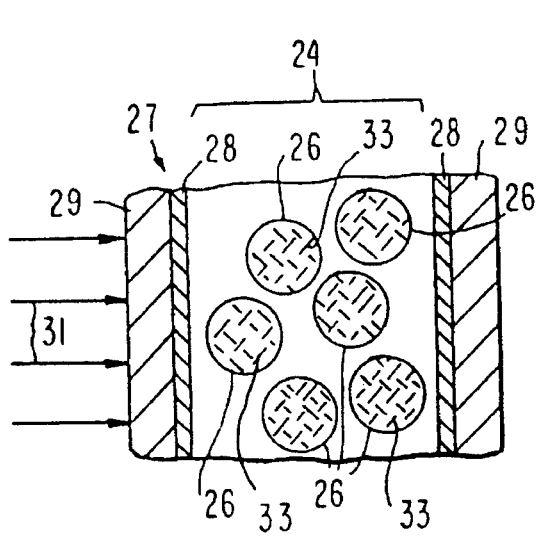
FIGS. 1A and 1B illustrate the closed and open states of one type of the film of an embodiment of the present invention.
Figure 1B:
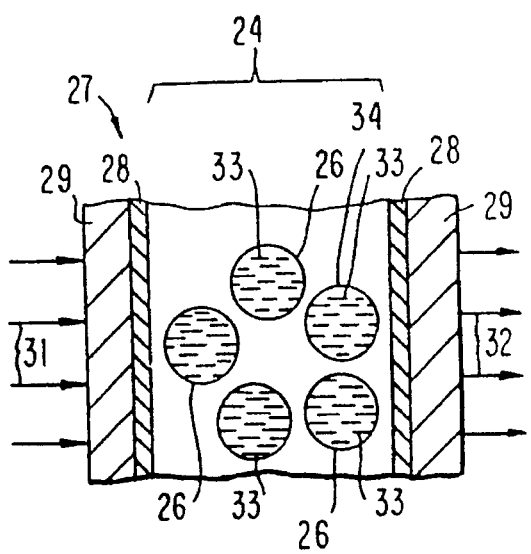

Referring to FIG. 1A, a beam of light 31 impinges on a film 27 of the present invention. Film 27 comprises a film 24 containing droplets 26, with electrodes 28 in contact with film 24. Protective layers 29 are in contact with each electrode 28. It is assumed that no potential difference, i.e., electric field, exists between the electrodes 28. Hence the particles 33 dispersed within the microdroplets 26 of the liquid suspension are in random positions due to Brownian Movement. Because the particles absorb light, a beam of light 31 impinging on the film is absorbed by particles 33 within the microdroplets 26. FIG. 1B assumes that an electric field (not shown) exists between the electrodes 28. As a result the particles 33 align within the microdroplets 26 and a considerable portion of the beam of light 31 passes through the film as indicated by the arrows 32.

Electrodes for use in light valves and methods of depositing electrodes on glass and plastic substrates are well known in the art. For example, see U.S. Pat. Nos. 3,512,876 and 3,708,219 which disclose use of electrodes in light valves, and see U.S. Pat. Nos. 2,628,927, 2,740,732, 3,001,901 and 3,020,376 which disclose articles having conductive and especially conductive transparent coatings on glass and plastic substrates and methods of forming or depositing such coatings. Indium tin oxide ("ITO") or other conductive metal can be used.

It is presently preferred that the electrode 28 and protective layer 29 be in the form of a prefabricated assembly. Thus, the electrode 28 and protective layer 29 can be provided by a film 29, such as a plastic film, that has been coated with an electrode 28 before application of the assembly to the film 24. As used herein the term "electrode" shall be understood to mean not only electrically conductive metal oxide and other coatings used in the art for such purpose but also such coatings which have dielectric overcoatings on them of materials such as silicon monoxide or dioxide, titanium dioxide, aluminum oxide, tantalum pentoxide, magnesium fluoride, etc. The electrodes may cover all or part of the substrate on which they are located and may also be applied in patterns. For example, in a light valve functioning as a variable light transmission window or filter for which one would usually wish to vary the amount of light passing through the entire active area of the device. On the other hand, if the light valve were intended to be used as a display device the electrodes would normally be deposited in patterns in discrete areas of the substrate. The term "electrode" as used herein also comprises use of semiconductor films and plural film layers, both transparent and colored, such as are used in active matrix addressed display devices. In all cases where the film of the present invention is used in a light valve device it is assumed that there are appropriate electrical connections leading to a power supply suitable to operate the device.

Although the usual type of liquid light valve suspension used in a light valve increases in light transmission when voltage is applied, it should be understood that the present invention also comprises light valves, films and liquid light valve suspensions which decrease in light transmission when a voltage is applied, as is disclosed in U.S. Pat. No. 4,078,856, or which when activated increase the transmission of radiation in one part of the electromagnetic spectrum and decrease transmission in another part of the spectrum as is disclosed in U.S. Pat. No. 3,743,382.

The film of the present invention can itself function as a light valve provided that it has electrodes on its surfaces or protective layers. However, if the film itself is to function as a light valve, electrodes should preferably be on the inside surface of each protective layer facing the interior part of the film to avoid being scratched and to minimize voltage required to activate the film. Also the external surfaces of the protective plastic layers may have thereon an ultraviolet absorbing lacquer filter such as the type sold by E. M. Chemicals of Hawthorne, N.Y. Numerous other clear surface coatings are commercially available to reduce abrasion and environmental attack especially on plastics. One such system is produced by The Silicone Products Division of General Electric Co., Waterford, N.Y., comprising a hard coating primer called SHP 200 plus SHC 1200 Silicone Hard Coating Resin. A radiation— curable clear coating that resists abrasion and ultraviolet degradation is sold by The Sherwin Williams Company of Chicago, Ill. under the name Permaclear UV.

The same types of surface coatings may be useful with other embodiments of the present invention, particularly where the film is sandwiched between hard plastic substrates such as polycarbonate.

The present invention is illustrated by the following Examples. All parts and percentages are by weight unless otherwise noted.

EXAMPLE 1

A cross-linkable copolymer emulsifier was prepared by combining (in a 3 neck, 500 ml round bottom flask equipped with condenser, thermometer, addition funnel, heating mantle and Teflon coated magnetic stirrer) 50 g of dihydroxy terminated polydimethylsiloxane (Mw 150,000), three drops (about 0.06 g) of dibutyltin dilaurate, 2 drops (about 0.04 g) of methacryloxypropyldimethoxymethylsilane, 2.5 g of n-butyl acrylate monomer and 200 g of hexyl acetate. The solution was heated to reflux, about 170° C., with stirring and then a solution consisting of three drops (about 0.06 g) of tert.-butyl peroxybenzoate and 10 g of hexyl acetate was added dropwise (via the addition funnel) over a 22 minute period. After the addition was complete, the reaction solution was allowed to reflux for a further hour. After the reaction was complete the solvent was removed by heating the mixture to boiling in a petri dish on a hot plate. This devolatilized material was a hazy viscous liquid. The resulting product was a cross-linkable copolymer emulsifier, having a polydimethysiloxane main chain terminated at each end by hydroxy groups and having pendant polybutylacrylate groups.

EXAMPLE 2

A film was prepared by adding, in the following order, 2.09 g of the cross-linkable copolymer emulsifier of Example 1, 0.60 g of a concentrate consisting of 30% by weight of crystals of pyrazine-2,5-dicarboxylic acid calcium polyiodide with a trace of ¼ sec SS type nitrocellulose and 70% by weight of a random copolymer of 98/2 n-butyl acrylate/maleic anhydride (liquid polymeric stabilizer), 0.11 g of dibutyltin dilaurate and 0.08 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in 30 minutes.

After curing, a piece of the film was cut out with scissors and placed film side down on an ITO coated sheet of ⅛ inch thick glass, ITO side up, which had been liberally covered with 3,6-dimethyl octane. After several seconds contact, the film buckled, swelled and released from the polyester substrate which was then removed. Another sheet of ITO coated glass was placed ITO side down on top of the film and the sandwich cell thus formed was sealed around the edges with a UV curable adhesive. The adhesive was cured in a UV exposure unit for several minutes.

After the UV adhesive was fully cured, leads were attached to the cell and an A.C. voltage of 200 V and 60 Hz was applied across the cell. Upon application of the voltage, the transmission of the cell changed from 7.11% OFF state to 18.25% ON state and the color changed from dark blue to a lighter blue. The decay time of the film measured from fully open to fully closed was about 3 seconds and the rise time was about 260 milliseconds.

EXAMPLE 3

A crosslinkable copolymer emulsifier was prepared by combining (in a 3 neck, 500 ml round bottom flask equipped with condenser, thermometer, addition funnel, heating mantle and Teflon coated magnetic stirrer) 0.03 g of methacryloxypropyltrimethoxysilane and 50 g of ethyl acetate to obtain Solution I. Solution I was heated to reflux (77° C.) with stirring and then about one gram of Solution II consisting of 0.2 g of azobisisobutyronitrile dissolved in 20 g of ethyl acetate (Solution II) was added (via the addition funnel). This was followed immediately by the addition of 2.2 g of neopentyl methacrylate monomer in 10 g of ethyl acetate. The reaction solution was then permitted to reflux for about 10 minutes after which the remainder of Solution II was added (via the addition funnel) over a 10 minute period. After the addition of Solution II was complete, the reaction solution was allowed to reflux for 10 minutes and then 140 g of Solution III consisting of 51.2 g of dihydroxy terminated polydimethylsiloxane (Mw 150,000) in 100 g of ethyl acetate was added (via the addition funnel). This was followed by the addition of one gram of dibutyltin dilaurate after which the reaction solution was permitted to reflux for a total of three hours and ten minutes. After the reaction was complete, the solvent was removed by heating the mixture to boiling in a petri dish on a hot plate. This devolatilized material was a hazy viscous liquid. The resulting product was a crosslinkable copolymer emulsifier having a polydimethylsiloxane main chain terminated at each end with hydroxy groups and having at least one silicon atom within the main chain linked to a pendant poly(neopentylmethacrylate) chain and to a pendant hydroxy-terminated polydimethylsiloxane chain.

EXAMPLE 4

A film was prepared by adding, in the following order, 2.34 g of the crosslinkable copolymer emulsifier of Example 3, 0.79 g of a concentrate consisting of 20% by weight of crystals of pyrazine-2,5-dicarboxylic acid calcium polyiodide with a trace of ¼ sec SS type nitrocellulose and 80% by weight of a random copolymer of 98/2 n-butyl acrylate/ maleic anhydride (liquid polymeric stabilizer), 0.09 g of dibutyltin dilaurate and 0.09 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in <28 minutes. After curing, a piece of the film was cut out with scissors and placed film side down on an ITO coated sheet of ⅛ inch thick glass, ITO side up, which had been liberally covered with 3,6-dimethyl octane. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. After the UV adhesive was fully cured, it was observed that the film was uniformly dark without any bleedout of the liquid light valve suspension. By preventing bleedout of suspension from the droplets of the liquid light valve suspension distributed in the cross-linked polymer matrix, the crosslinkable copolymer emulsifier enables the production of darker, thinner, more uniform films than was previously possible. The OFF state transmission of the cell was 2.59%. This should be compared to the following Comparative Example A.

Comparative Example A

A film was prepared by adding, in the following order, 2.32 g of dihydroxy terminated polydimethyl siloxane (MW 150,000), 0.82 g of a concentrate consisting of 20% by weight of crystals of pyrazine-2,5-dicarboxylic acid calcium polyiodide with a trace of ¼ sec SS type nitrocellulose and 80% by weight of a random copolymer of 98/2 n-butyl acrylate/maleic anhydride (liquid polymeric stabilizer), 0.11 g of dibutyltin dilaurate and 0.10 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in 33 minutes.

After curing, a piece of the film was cut out with scissors and placed film side down on an ITC coated sheet of ⅛ inch thick glass, ITC side up, which had been liberally covered with 3,6-dimethyl octane. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. After the UV adhesive was fully cured, it was readily observed that the film suffered from serious bleed out of the liquid light valve suspension from the film. The OFF state transmission of this film, which was very spotty and nonuniform, was 21.41%.

EXAMPLE 5

A crosslinkable copolymer emulsifier was prepared by combining (in a 3 neck, 25 ml round bottom flask equipped with condenser, thermometer, addition funnel, heating mantle and Teflon coated magnetic stirrer) 0.06 g of methacryloxypropyltrimethoxysilane and 50 ml of ethyl acetate (Solution I). Solution I was heated to reflux (77° C.) with stirring and then about two grams of Solution II consisting of 0.2 g of azobisisobutyronitrile dissolved in 20 ml of ethyl acetate was added (via the addition funnel). This was followed immediately by the addition of 2.2 g of neopentyl methacrylate monomer in 10 ml of ethyl acetate. The reaction solution was then permitted to reflux for about 10 minutes after which the remainder of Solution II was added (via the addition funnel) over a 23 minute period. After the addition of Solution II was complete, the reaction solution was allowed to reflux for about one hour and then Solution III consisting of 52 g of dihydroxy terminated polydimethylsiloxane (Mw 150,000) in 100 ml of ethyl acetate was added (via the addition funnel). This was followed by the addition of one gram of dibutyltin dilaurate in 50 ml of ethyl acetate after which the reaction solution was permitted to reflux for a total of one hour and thirty-five minutes. After the reaction was complete, the solvent was removed by heating the mixture to boiling in a petri dish on a hot plate. This devolatilized material was a hazy viscous liquid. Since a stoichiometric excess of the methacryloxypropyl-trimethoxysilane was used, the resulting product was a crosslinkable copolymer emulsifier having a polydimethylsiloxane main chain terminated at each end with hydroxy groups and having pendant poly(neopentyl methacrylate) groups and pendant methoxy groups.

EXAMPLE 6

A film was prepared by adding, in the following order, 2.08 g of the crosslinkable copolymer emulsifier of Example 5, 1.07 g of a concentrate consisting of 20% by weight of crystals of pyrazine-2,5-dicarboxylic acid calcium polyiodide with a trace of ¼ sec SS type nitrocellulose and 80% by weight of a random copolymer of 98/2 n-butyl acrylate/ maleic anhydride (liquid polymeric stabilizer), 0.11 g of dibutyltin dilaurate and 0.07 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in 26 minutes.

After curing, a piece of the film was cut out with scissors and placed film side down on an ITO coated sheet of ⅛ inch thick glass, ITO side up, which had been liberally covered with 3,6-dimethyl octane. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. After the UV adhesive was fully cured, it was readily observed that the film was uniformly dark without any bleedout of liquid light valve suspension from the film. The OFF state transmission of the cell was 0.42%. This should be compared to comparative example A.

EXAMPLE 7

A crosslinkable copolymer emulsifier was prepared by combining (in a 3 neck, 500 ml round bottom flask equipped with condenser, thermometer, addition funnel, heating mantle and Teflon coated magnetic stirrer) 0.30 g of methacryloxypropyltrimethoxysilane, 5 g of n-butyl acrylate monomer and 50 ml of ethyl acetate (Solution I). The solution was heated to reflux (77° C.) with stirring and then 15 ml of Solution II consisting of 0.4 g of azobisisobutyronitrile dissolved in 25 ml of ethyl acetate was added (via the addition funnel) over a period of 20 minutes. The reaction solution was then permitted to reflux for 35 minutes after which the remainder of Solution II was added (via the addition funnel). After the addition of Solution II was complete the reaction solution was allowed to reflux for about one hour and then Solution III consisting of 100 g of dihydroxy terminated polydimethylsiloxane (Mw 12,000) in 100 ml of ethyl acetate was added (via the addition funnel). This was followed by the addition of one gram of dibutyltin dilaurate after which the reaction solution was permitted to reflux for a total of two hours and twenty minutes. After the reaction was complete, the solvent was removed by heating the mixture to boiling in a petri dish on a hot plate. This devolatilized material was a hazy viscous liquid. The resulting product was a Crosslinkable emulsifier having a polydimethylsiloxane main chain terminated at each end with hydroxy groups and having pendant poly(butylacrylate) groups and pendant methoxy groups.

EXAMPLE 8

A film was prepared by adding, in the following order, 1.70 g of the crosslinkable copolymer emulsifier of Example 7, 0.50 g of a concentrate consisting of 20% by weight of crystals of pyrazine-2,5-dicarboxylic acid calcium polyiodide with a trace of ¼ sec SS type nitrocellulose 20% by weight of a block copolymer of approximately 99.7%/0.3% neopentyl methacrylate/hydroxyethyl methacrylate (solid polymeric stabilizer) and 60% by weight of tri-n-butyl trimellitate, 0.17 g of dibutyltin dilaurate and 0.11 g of tetra-n-butyl orthosilicate (tetra-n-butoxy silane). After each addition this was mixed with a high speed homogenizer and degassed under vacuum. After the final addition was complete, the material was spread with a doctor blade in a layer 4 mils thick on a piece of 5 mil polyester sheeting and cured in an oven at 85° C. This film cured in 35 minutes. After curing, a piece of the film was cut out with scissors and placed film side down on an ITO coated sheet of ⅛ inch thick glass, ITO side up, which had been liberally covered with 0.8 Halocarbon oil, a low molecular weight oligomer of chlorotrifluoroethylene available from Halocarbon Products. After several seconds contact, the film buckled, swelled and released from the polyester substrate which was then removed. Another sheet of ITO coated glass was placed ITO side down on top of the film and the sandwich cell thus formed was sealed around the edges with UV-curable adhesive. The adhesive was cured in a UV exposure unit for several minutes. After the UV adhesive was fully cured, it was readily observed that the film was uniformly dark without any bleedout of liquid light valve suspension.

EXAMPLE 9

A crosslinkable copolymer emulsifier was prepared by combining (in a 3 neck, 500 ml round bottom flask equipped with condenser, thermometer, addition funnel, heating mantle and Teflon coated magnetic stirrer) 0.01 g of acryloxypropyltrimethoxysilane, 0.34 g of heptafluorobutyl acrylate monomer and 40 ml of xylene (Solution I). Solution I was heated to reflux (137° C.) with stirring and then 12 ml of Solution II consisting of 0.03 g of azobisisobutyronitrile dissolved in 22 ml of xylene was added (via the addition funnel) over a period of 8 minutes. The reaction solution was then permitted to reflux for 16 minutes after which 0.7 g of heptafluorobutyl acrylate was added and the reaction solution was permitted to reflux for 14 minutes after which the remainder of Solution II was added (via the addition funnel) over a period of 26 minutes. After the addition of Solution II was complete, the reaction solution was allowed to reflux for 30 minutes and then Solution III consisting of 21.33 g of dihydroxy terminated polydimethylco-methylphenylsiloxane (4.15 mole % phenyl) (Mw about 150,000) in about 50 ml of xylene was added (via the addition funnel). This was followed by the addition of 0.1 ml of dibutyltin dilaurate after which the reaction solution was permitted to reflux for a total of one hour. After the reaction was complete, the solvent was removed by heating the mixture to boiling in a petri dish on a hot plate. This devolatilized material was a hazy viscous liquid. The product was a crosslinkable copolymer emulsifier having a (dimethylsiloxane)(phenylmethyl siloxane) copolymer main chain terminated with hydroxy groups at each end and having at least one silicon atom within the main chain linked to a pendant poly(heptafluorobutyl acrylate) chain and to a pendant hydroxy-terminated polydimethylsiloxane chain.

EXAMPLE 10

(A) Preparation of Cured Film

A film was prepared by adding, in the following order, 2.01 g of the crosslinkable copolymer emulsifier of Example 9, 0.54 g of a concentrate consisting of 20% by weight of crystals of pyrazine-2,5-dicarboxylic acid calcium polyiodide with a trace of ¼ sec SS type nitrocellulose and 80% by weight of a random copolymer of 70/30/2 n-butyl acrylate/ heptafluorobutyl acrylate/maleic anhydride (liquid polymeric stabilizer), 0.10 g of dibutyltin dilaurate and 0.08 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in 45 minutes.

(B) Preparation of Light Valve

After curing, a piece of the film was cut out with scissors and placed film side down on an ITO coated sheet of ⅛ inch thick glass, ITO side up, which had been liberally covered with liquid $CCl_3CF_2CFClCF_2Cl$, available as Halocarbon 455 from Halocarbon Products. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes.

After the UV adhesive was fully cured, it was readily observed that the film was non-hazy. The OFF state haze of the film was 9.7% and the ON state haze (100 v, 60 Hz) was 2.9%. The OFF state transmission of the cell was 27.4% and the ON state transmission was 62.4%.

EXAMPLE 11

The cured film obtained from Part A of Example 10 above was swollen with $CCl_3CF_2CFCl_2$, available as Halocarbon 335 from Halocarbon Products. The OFF state haze was 5.7%, while the ON state haze (200 v, 60 Hz) was 2%. The transmission range of the film was from 45% OFF to 72% ON.

EXAMPLE 12

A film was prepared by adding, in the following order, 2.14 g of the crosslinkable copolymer emulsifier of Example 3, 0.51 g of a concentrate consisting of 20% by weight of crystals of pyrazine-2,5-dicarboxylic acid calcium polyiodide with a trace of ¼ sec SS type nitrocellulose and 80% by weight of a random copolymer of 98/2 n-butyl acrylate/ maleic anhydride (liquid polymeric stabilizer) 0.08 g of dibutyltin dilaurate and 0.08 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in 22 minutes.

After curing, a piece of the film was cut out with scissors and placed film side down on an ITO coated sheet of ⅛ inch thick glass, ITO side up, which had been liberally covered with 0.8 Halocarbon oil. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. The OFF state transmission of the cell was 8.92%. The OFF state haze of the cell was 37.8%.

EXAMPLE 13

A film was prepared by adding, in the following order, 2.10 g of the crosslinkable copolymer emulsifier of Example 3, 0.52 g of a concentrate consisting of 20% by weight of crystals of pyrazine-2,5-dicarboxylic acid calcium polyiodide with a trace of ¼ sec SS type nitrocellulose and 80% by weight of a random copolymer of 90/10/2 n-butyl acrylate/ heptafluorobutyl acrylate/maleic anhydride (liquid polymeric stabilizer), 0.09 g of dibutyltin dilaurate and 0.09 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in approximately 30 minutes.

After curing, a piece of the film was cut out with scissors and placed film side down on an ITO coated sheet of ⅛ inch thick glass, ITO side up, which had been liberally covered with 0.8 Halocarbon oil. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. The OFF state transmission of the cell was 7.61% and the ON state transmission at 100 UV, 60 Hz was 39.2%. The OFF state haze of the cell was 31.3% and the ON state haze was 28%.

EXAMPLE 14

A film was prepared by adding, in the following order, 2.06 g of the crosslinkable copolymer emulsifier of Example 3, 0.50 g of a concentrate consisting of 20% by weight of crystals of pyrazine-2,5-dicarboxylic acid calcium polyiodide with a trace of ¼ sec SS type nitrocellulose and 80% by weight of a random copolymer of 80/20/1 n-butyl acrylate/ heptafluorobutyl acrylate/maleic anhydride (liquid polymeric stabilizer), 0.08 g of dibutyltin dilaurate and 0.08 g of tetra-n-butyl orthosilicate (tetra-n-butoxy silane, Aldrich). After each addition, this was mixed with a high speed homogenizer and degassed under vacuum. After the final addition was complete, the material was spread with a doctor blade in a layer 4 mil thick on a piece of 5 mil polyester sheeting and cured in an oven at 85° C. This film cured in approximately 30 minutes.

After curing, a piece of the film was cut out with scissors and placed film side down on an ITO coated sheet of ⅛ inch thick glass, ITO side up, which had been liberally covered with 0.8 Halocarbon Oil. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes. The OFF state transmission of the cell was 6.16% and the ON state (100 V, 60 Hz) was 25.17%. The OFF state haze of the cell was 23.9% and the ON state haze was 21.3%.

EXAMPLE 15

A film was prepared by adding, in the following order, 2.05 g of the crosslinkable copolymer emulsifier of Example 3, 0.49 g of a concentrate consisting of 20% by weight of crystals of pyrazine-2,5-dicarboxylic acid calcium polyiodide with a trace of ¼ sec SS type nitrocellulose and 80% by weight of a random copolymer of 70/30/1 n-butyl acrylate/heptafluorobutyl acrylate/maleic anhydride (liquid polymeric stabilizer), 0.08 g of dibutyltin dilaurate and 0.08 g of tetra-n-butyl orthosilicate (tetra-n-butoxy silane). After each addition, this was mixed with a high speed homogenizer and degassed under vacuum. After the final addition was complete, the material was spread with a doctor blade in a layer 4 mils thick on a piece of 5 mil polyester sheeting and cured in an oven at 85 degrees centigrade. This film cured in 20 minutes.

After curing, a piece of the film was cut out with scissors and placed film side down on an ITO coated sheet of ⅛ inch thick glass, ITO side up, which had been liberally covered with 0.8 Halocarbon oil. After several seconds contact, the film buckled, swelled and released from the polyester substrate which was then removed. Another sheet of ITO coated glass was placed ITO side down on top of the film and the sandwich cell thus formed was sealed around the edges with a UV-curable adhesive. The adhesive was cured in a UV exposure unit for several minutes.

The OFF state transmission of the cell thus formed was 11.58% and the ON state transmission (100 V, 60 Hz) was 27.16%. The OFF state haze of the cell was 19.2% and the ON state haze was 15%.

EXAMPLE 16

A film is prepared by combining, in the order indicated, two grams of hydroxy terminated poly(dimethyl-co-methylphenyl)siloxane matrix polymer (5 mole % phenyl), 0.2 g of a block copolymer emulsifier consisting of poly(dimethyl-co-methylphenyl) (5 mole % phenyl)siloxane-co-(68/32 random copolymer) poly(n-butyl acrylate-co-heptafluorobutyl acrylate), 0.5 g of a concentrate consisting of 20% crystals of pyrazine 2,5-dicarboxylic acid calcium polyiodide with a trace of ss ¼ second nitrocellulose and 80% of a random copolymer of n-butyl acrylate/heptafluorobutyl acrylate/maleic anhydride 67/31/1 (liquid polymeric stabilizer), 0.1 g of dibutyltin dilaurate and 0.08 g of tetrabutoxy silane. The combined ingredients are mixed after each addition with a high speed homogenizer and then vacuum degassed. The mixture is spread in a layer 4 mils thick with a doctor blade on a sheet of 5 mil polyester and then cured at 85° C.

After curing, a piece of the film is cut out with scissors and placed film side down on an ITO coated sheet of ⅛ inch thick glass, ITO side up, which has been liberally covered with Halocarbon 335. After several seconds contact this film buckles, swells and releases from the polyester substrate, which is then removed. Another sheet of ITO coated glass is placed ITO side down on top of the film and the sandwich cell thus formed is sealed around the edges with a UV-curable adhesive. The adhesive is cured in a UV exposure unit for several minutes.

The haze in this film cell is comparable to the haze in the film of Example 10.

EXAMPLE 17

Preparation Of Dihydroxy-Terminated Poly(Dimethyl-Co-Methylphenyl)Siloxane

The title polymer, containing 5.03 mole % phenyl, was prepared by combining (in a 3 neck, 500 ml round bottom flask equipped with condenser, ice bath, thermometer, addition funnel, and Teflon coated magnetic stirrer) 130 g of dichlorodimethylsilane and 20 g of dichloromethylphenylsilane. To this was added, over several hours and with stirring, a solution of 116.6 g of sodium carbonate in 408.1 g of water. After the evolution of carbon dioxide had subsided, the siloxane polymer was separated from the aqueous layer and dried over anhydrous sodium carbonate. 20 g of the above product was then combined with one gram of concentrated sulfuric acid and stirred with heating in order to raise the molecular weight of the polymer. As soon as the molecular weight increased to the desired range, as evidenced by the increase of the viscosity of the mixture, a solution of sodium carbonate in water was added with stirring to terminate the reaction and then 10 ml of heptane was added. The solution of the siloxane in heptane was separated from the aqueous layer and dried over anhydrous sodium carbonate and then filtered and the heptane was removed under vacuum.

The recovered title polymer was a clear colorless viscous liquid having a refractive index of 1.4399 at 20.6° C.

EXAMPLE 18

Preparation Of A Block Copolymer Emulsifier An A-B-A block copolymer of poly(dimethyl-co-methylphenyl) siloxane(B)-co-poly(n-butyl acrylate/heptafluorobutyl acrylate) (A) was prepared by combining (in a 3 neck, 250 ml round bottom flask equipped with condenser, thermometer, addition funnel, heating mantle and teflon coated magnetic stirrer) 0.13 g of 1,3-bis[(p-acryloxy-methyl) phenethyl] tetramethyldisiloxane, 0.19 g of heptafluorobutyl acrylate monomer, 0.45 g of n-butyl acrylate monomer and 20 ml of xylene (Solution I). Solution I was heated to reflux (about 139° C.) with stirring and then 14 ml of a solution consisting of 0.06 g of azobisisobutyronitrile in 29 ml of xylenes (Solution II) was added (via the addition funnel) over a 22 minute period. After the addition was complete, the reaction solution was allowed to reflux for a further 33 minutes after which the remainder of Solution II was added, the solution was allowed to reflux for a further 34 minutes, then 5 g of the siloxane copolymer of Example 17. and about one ml of concentrated sulfuric acid was added and the reaction solution was refluxed for 50 minutes. After the reaction was complete the solution was neutralized by the addition of an excess of aqueous sodium carbonate and the xylene-emulsifier phase was separated from the aqueous layer and dried over anhydrous sodium carbonate. Then the solvent was removed by heating the mixture to boiling in a petri dish on a hot plate. This devolatilized material was a yellowish viscous liquid.

EXAMPLE 19

A film was prepared by adding, in the following order, 2.01 g of the phenyl-substituted dihydroxy terminated polyorganosiloxane of Example 17, 0.11 g of the block copolymer emulsifier of Example 18, 0.51 g of a concentrate consisting of 20% by weight of crystals of pyrazine-2,5-dicarboxylic acid calcium polyiodide with a trace of ¼ sec SS type nitrocellulose and 80% by weight of a random copolymer of 70/30/1 n-butyl acrylate/heptafluorobutyl acrylate/maleic anhydride (liquid polymeric stabilizer), 0.10 g of dibutyltin dilaurate and 0.08 g of tetra-n-butyl orthosilicate (tetra-n-butoxy silane). After each addition this was mixed with a high speed homogenizer and degassed under vacuum. After the final addition was complete the material was spread with a doctor blade in a layer 4 mil thick on a piece of 5 mil polyester sheeting and cured in an oven at 85° C. This film cured in one hour.

After curing, a piece of the film was cut out with scissors and placed film side down on an ITO coated sheet of ⅛ inch thick glass, ITO side up, which has been liberally covered with 0.8 Halocarbon oil. After several seconds contact this film buckled, swelled and released from the polyester substrate which is then removed. Another sheet of ITO coated glass was placed ITO side down on top of the film and the sandwich cell thus formed was sealed around the edges with a UV-curable adhesive. The adhesive was cured in a UV exposure unit for several minutes.

After the UV adhesive was fully cured, leads were attached to the cell and an A.C. voltage of 100 V and 80 Hz was applied across the cell. Upon application of the voltage the transmission of the cell changed from 29.6% OFF state to 69.6% ON state and the color change from light blue to colorless. The haze went from 8.4% OFF state to 3.4% ON state.

EXAMPLE 20

A cell was prepared using the film of Example 19 but substituting Halocarbon 455 in place of the 0.8 Halocarbon oil and a voltage of 200 volts at 60 Hz was applied to the cell. The OFF state transmission of the cell was 28.3% and the ON state transmission was 69.4%. The OFF state haze of the film was 6.5% and the ON state haze was 2.4%.

EXAMPLE 21

A cell was prepared using the film of Example 19 above but substituting Halocarbon 335 for the 0.8 Halocarbon oil. A voltage of 200 V,60 Hz was applied to the cell. The OFF state transmission of the cell was 30.1% and the ON state transmission was 71.2%. The OFF state haze of the cell was 6.1% and the ON state haze of the cell was 1.8%.

Example 22

A. Preparation Of Dihydroxy-Terminated Poly(Dimethyl-Co-Methylphenyl)Siloxane

A crosslinkable emulsifier was prepared by first preparing a hydroxy terminated polydimethyl-co-methylphenyl siloxane copolymer through a base catalyzed ring opening reaction as follows. In a three-necked 250 ml round bottom flask equipped with thermometer, condenser and Teflon-coated stirring bar were combined 100 g of octamethylcyclotetrasiloxane and 21.8 g of trimethyltriphenylcyclotrisiloxane. The reactants were heated to 165° C. and then 0.1 g of a complex consisting of 33 wt % potassium hydroxide in 2-propanol was added, with stirring, and the mixture was heated for 30 minutes and then the reactants were heated for a further three and one half hours at 150° C. to drive the reaction to completion. The copolymer recovered was a clear colorless viscous liquid having 5 mole percent phenyl and a Mw of about 10,000.

B. Preparation Of Cross-Linkable Copolymer Emulsifier

To a three-necked 250 ml round bottom flask, equipped with condenser, thermometer, addition funnel and a Teflon-coated magnetic stirrer, there was added 0.81 g of acryloxypropyltrimethoxysilane, 1.50 g of heptafluorobutylacrylate monomer, 3.5 g of n-butylacrylate monomer and 15 ml of hexyl acetate. The combined reactants were heated, with stirring, to reflux (about 150° C.) and then 12.5 ml of a solution consisting of 0.3 g of azobisisobutyronitrile ("AIBN") in 25 ml of hexyl acetate was added over a four minute period. The solution was allowed to reflux for one half hour and then another 12.5 ml of the AIBN solution was added, with stirring, and the solution was refluxed for a further 30 minutes.

To the above solution was then added 105.5 g of the copolymer from Part A of this Example 22 and 1 ml of dibutyltin dilaurate, and the solution was heated to 184° C. for 30 minutes. After the reaction was complete, 50 ml of hexyl acetate was added to the reaction solution and the solution was filtered through a 40–60 C. glass frit and devolatilized on a hot plate followed by vacuum. The crosslinkable copolymer emulsifier recovered was an amber viscous liquid. The product was a crosslinkable copolymer emulsifier having a (dimethylsiloxane) (phenylmethyl siloxane) copolymer main chain terminated with hydroxy groups at each end and having at least one silicon atom within the main chain linked to a pendant poly(heptafluorobutylacrylate-butyl acrylate) chain.

EXAMPLE 23

A film was prepared by adding, in the following order, 2.03 g of the crosslinkable copolymer emulsifier of Part B of Example 22, 0.51 g of a concentrate consisting of 20% by weight of crystals of pyrazine-2,5-dicarboxylic acid calcium polyiodide with a trace of ¼ sec SS type nitrocellulose and 80% by weight of a random copolymer of 70/30/1 n-butyl acrylate/heptafluorobutylacrylate/maleic anhydride (Mw about 100,000), 0.13 g of dibutyltin dilaurate and 0.10 g of tetra-n-butyl orthosilicate (tetra-n-butoxy silane). After each addition, this was mixed with a high speed homogenizer and degassed under vacuum. After the final addition was complete the material was spread with a doctor blade in a layer 4 mil thick on a piece of 5 mil polyester sheeting and cured for six days. After curing, a piece of the film was cut out with scissors and placed film side down on an ITO coated sheet of ⅛ inch thick glass, ITO side up, which had been liberally covered with Halocarbon 335. After several seconds contact, the film buckled, swelled and released from the polyester substrate which was then removed. Another sheet of ITO coated glass was placed ITO side down on top of the film and the sandwich cell thus formed was sealed around the edges with a UV curable adhesive. The adhesive was cured in a UV exposure unit for several minutes.

After the UV adhesive was fully cured, the cell was energized by application of 200 v, 60 Hz. The OFF state transmission of the cell was 33.7%, the ON state was 56.3%. The OFF state haze was 8.9% and the ON state haze 4.4%.

EXAMPLE 24

Preparation Of Dihydroxy Terminated Silphenylene Siloxane Copolymer

Into a three-necked 250 ml round bottom flask, equipped with thermometer, condenser and Teflon-coated magnetic stirrer was charged 5.68 g of bis(hydroxydimethylsilyl)benzene, 13.93 g of hexamethylcyclotrisiloxane ane 20.29 g of ethyl acetate. The combined reactants were heated to reflux, with stirring, to form a suspension of bis(hydroxydimethylsilyl)benzene crystals in a mixture of hexamethylcyclotrisiloxane and ethyl acetate. Upon the addition of one ml of concentrated sulfuric acid, the suspended crystals were dissolved and the reaction solution was then allowed to reflux for several hours. After the reaction was complete, about 50 ml of heptane was added and the solution was washed several times with water to remove the acid. The solution was dried overnight over neutral alumina and then the heptane was removed under vacuum. This devolatilized material was a clear viscous liquid and was a dihydroxy terminated silphenylene-siloxane copolymer containing about 5 mole % of phenyl groups and having an Mw of about 30,000.

EXAMPLE 25

A low molecular weight, liquid polymeric stabilizer was prepared by combining, in a three-necked 250 ml round bottom flask equipped with thermometer, condenser, addition funnel, and Teflon-coated magnetic stirrer, 14 g of n-butyl acrylate, 6 g of heptafluorobutyl acrylate, 0.2 g of maleic anhydride and 100 ml of hexyl acetate. The mixture was heated, with stirring, to reflux (164° C.) and then a solution consisting of 1 g of tert-butyl peroxybenzoate in 50 ml of hexyl acetate was added over a period of 20 minutes and the solution was allowed to reflux for 50 minutes. The solvent was removed via vacuum distillation and the product was a clear colorless, low viscosity liquid. The liquid polymeric stabilizer was a random copolymer (70/30/1) of n-butyl acrylate/heptafluorobutyl acrylate/maleic anhydride (Mw about 2,500).

EXAMPLE 26

A film was prepared by combining, in the order indicated, 1.09 g of the crosslinkable copolymer emulsifier of Example 3, 0.21 g of a concentrate consisting of 20 wt % crystals of pyrazine-2,5-dicarboxylic acid calcium polyiodide with a trace of ¼ second ss type nitrocellulose and 80 wt % of the liquid polymeric stabilizer of Example 25, 0.06 g of dibutyltin dilaurate, and 0.04 g of tetra-n-butyl orthosilicate. The mixture was stirred with a high speed homogenizer after each addition and vacuum degassed. After the final addition the resulting emulsion was spread on the ITO coated side of two sheets of ITO coated glass with spacers and then two more sheets were placed ITO side down on top to form two sandwich cells of 1 and 5 mils respectively.

The cells were cured by placing them in an oven at 85° C. for one hour. After curing the one mil cell was energized by the application of 105 v, 400 Hz and the transmission and haze were measured. The OFF state transmission of the cell was 8.32% and the haze was 78.3%. The ON state transmission of the cell was 39% and the ON state haze was 79.1%.

EXAMPLE 27

A film was prepared by adding, in the following order, 1.01 g of the silphenylene-siloxane copolymer of Example 24, 0.21 g of a concentrate consisting of 20% by weight of crystals of pyrazine-2,5-dicarboxylic acid calcium polyiodide with a trace of ¼ sec SS type nitrocellulose and 80% by weight of the liquid polymeric stabilizer of Example 25, 0.05 g of dibutyltin dilaurate and 0.05 g of tetra-n-butyl orthosilicate (tetra-n-butoxy silane). After each addition this was mixed with a high speed homogenizer and degassed under vacuum, after the final addition was complete the emulsion was spread on a sheet of ITO coated glass with 5 mil spacers and a second sheet of ITO coated glass was placed on top. The sandwich cell thus formed was cured on an 85° C. oven for one hour.

The cured cell which contained an unswelled film was energized by the application of 250 V, 400 Hz and the ON and OFF state transmission and haze were measured. The OFF state transmission of the cell was 3.47% and the OFF state haze was 47.3%. The ON state transmission of the cell was 33.86% and the ON state haze was 20.8%.

I claim:

1. A film suitable for use as the light-modulating unit of a light valve, comprising a cross-linked polymer matrix having droplets of a liquid light valve suspension distributed in the cross-linked polymer matrix, said liquid light valve suspension comprising particles suspended in a liquid suspending medium, said polymer matrix comprising a main chain that is insoluble in said liquid suspending medium and pendant polymeric groups that are soluble in said liquid suspending medium.

2. The film according to claim 1, wherein said liquid suspending medium is electrically resistive and comprises in whole or in part a liquid polymeric stabilizer that prevents agglomeration of said particles.

3. The film according to claim 2, wherein said main chain is selected from the group consisting of polybutadiene, polystyrene, poly(cyclopropane), polyamide, polyolefin, silicone gum, polyacrylamide, polyester, polyether and polyurethane.

4. The film according to claim 2, wherein said pendant polymeric groups are selected from the group consisting of polyacrylates, polymethacrylates, polyethers, polymethylstyrenes, alkyd resins, polyamides, polyurethanes, polycarbonates, and epoxy resins.

5. The film according to claim 2, wherein said main chain comprises a polyorganosiloxane.

6. The film according to claim 5, wherein said pendant polymeric groups are polyacrylates and/or polymethacrylates.

7. In a light valve having opposed cell walls, the improvement wherein the film according to claim 1 is between said cell walls as the light-modulating unit of the light valve.

8. A film suitable for use as the light-modulating unit of a light valve, comprising a cross-linked polymer matrix in the form of a film having droplets of a liquid light valve suspension distributed in the cross-linked polymer matrix, said liquid light valve suspension comprising particles suspended in a liquid suspending medium comprising in whole or in part a liquid polymeric stabilizer that is effective to prevent agglomeration of said particles.

9. The film according to claim 8, wherein said liquid polymeric stabilizer comprises polymerized units of alkyl(meth)acrylates and/or fluorinated alkyl(meth)acrylates.

10. The film according to claim 9, wherein said liquid polymeric stabilizer comprises polymerized units of an unsaturated acid, ester or anhydride.

11. The film according to claim 10, wherein said liquid polymeric stabilizer comprises a copolymer derived from an alkyl(meth)acrylate, a fluorinated alkyl(meth)acrylate and an unsaturated acid, ester or anhydride thereof.

12. In a light valve having opposed cell walls, the improvement wherein the film according to claim 8 is between said cell walls as the light-modulating unit of the light valve.

13. A film suitable for use as the light-modulating unit of a light valve, comprising a cross-linked polyorganosiloxane polymer matrix having droplets of a liquid light valve suspension distributed in the cross-linked polyorganosiloxane polymer matrix, said light valve suspension comprising particles suspended in a liquid suspending medium comprising in whole or in part a liquid fluorinated polymeric stabilizer that is effective to prevent agglomeration of said particles.

14. The film according to claim 13, wherein said polyorganosiloxane polymer matrix contains aromatic groups.

15. The film according to claim 14, wherein said liquid polymeric stabilizer comprises a copolymer derived from an alkyl(meth)acrylate, a fluorinated alkyl(meth)acrylate and an unsaturated acid, ester or anhydride thereof.

16. The film according to claim 14, wherein said polymer matrix is a copolymer of an alkylsiloxane and a diphenylsiloxane, a copolymer of an alkylsiloxane and a phenylalkylsiloxane or is a silphenylenealkylsiloxane copolymer.

17. The film according to claim 13, wherein said polyorganosiloxane polymer matrix includes a main chain comprising a dimethylsiloxane-phenylmethylsiloxane copolymer or a dimethylsiloxane-silphenylene copolymer, said main chain having pendant poly(fluorinated alkyl(meth)acrylate) groups and said liquid polymeric stabilizer comprises a copolymer derived from an alkyl(meth)acrylate, a fluorinated alkyl(meth)acrylate and an unsaturated acid, ester or anhydride thereof.

18. The film according to claim 13, wherein an electrode is in contact with each surfaces of the film.

19. The film according to claim 13, wherein an electrode is in contact with each surfaces of the film and a protective layer is in contact with the outer surface of each of said electrodes.

20. The film according to claim 13, wherein a protective layer is in contact with over both surfaces of the film.

21. The film according to claim 13, wherein a protective layer is in contact with each surface of the film and an electrode is in contact with the outer surface of each of the protective layers.

22. The film according to claim 13, wherein said film, while in its cured, cross-linked form, has been swollen with an organic liquid to form a liquid-swollen film that is less light-scattering as compared to said film prior to being swollen with said liquid.

23. In a light valve having opposed cell walls, the improvement wherein the film according to claim 13 is between said cell walls as the light-modulating unit of the light valve.

24. A liquid suspension for use in a light valve, comprising particles suspended in a liquid suspending medium comprising in whole or in part a liquid polymeric stabilizer that is effective to prevent agglomeration of said particles.

25. The liquid suspension according to claim 24, wherein said liquid polymeric stabilizer comprises polymerized units of alkyl(meth)acrylates and/or fluorinated alkyl(meth)acrylates.

26. The liquid suspension according to claim 25, wherein said liquid polymeric stabilizer comprises polymerized units of an unsaturated acid, ester or anhydride.

27. The liquid suspension according to claim 26, wherein said liquid polymeric stabilizer comprises a copolymer derived from an alkyl(meth)acrylate, a fluorinated alkyl(meth)acrylate and an unsaturated acid, ester or anhydride thereof.

28. A film suitable for use as the light-modulating unit of a light valve, comprising a polymer matrix having droplets of a liquid light valve suspension distributed therein, said liquid light valve suspension comprising organic particles suspended in a liquid portion that optionally contains or is a polymeric stabilizer effective to prevent agglomeration of the organic particles, the indices of refraction of said polymer matrix and said liquid portion being similar, whereby the optical clarity of the film is improved.

* * * * *